United States Patent [19]

Mittal et al.

[11] 4,348,705
[45] Sep. 7, 1982

[54] RANDOM ACCESS FLEXIBLE DISK MEMORY

[75] Inventors: Faquir C. Mittal, Audubon; Frank J. Arrison, Warrington; Arnold Schonfeld, Norristown, all of Pa.

[73] Assignee: Sperry Corporation, New York, Nebr.W YORK

[21] Appl. No.: 147,039

[22] Filed: May 7, 1980

Related U.S. Application Data

[63] Continuation of Ser. No. 958,599, Nov. 7, 1978.

[51] Int. Cl.³ .................. G11B 5/012; G11B 21/02
[52] U.S. Cl. ............................ 360/98; 360/99; 360/122; 360/135
[58] Field of Search ........................ 360/98–99, 360/133, 135, 97

[56] References Cited

U.S. PATENT DOCUMENTS 3,618,055 11/1971 Van Acker et al. ............ 360/98
3,703,713 11/1972 Pohm et al. .................... 360/99
3,931,645 1/1976 Dodd et al. .................... 360/135

OTHER PUBLICATIONS

IEEE Transaction on Magnetics, Sep. 1972, pp. 574–576, "Proposal for a $10^{12}$ Bit Flexible Disk Pack Memory" by Pohm et al.

Primary Examiner—John H. Wolff
Attorney, Agent, or Firm—Robert E. Lee, Jr.; B. Franklin Griffin

[57] ABSTRACT

There is disclosed a closely arranged file of flexible rotating disk memory elements in which a disk may be randomly accessed with minimum error and relatively rapid access time. This disk system utilizes different diameter disks which are arranged in an ascending order in a sub-stack, are rotated at a relatively slow speed. A plurality of the sub-stacks, wherein there is a correspondence between the same diameter disk of each stack, are utilized to provide for a large memory capacity. Microprocessing techniques are utilized for sub-stack and disk selection.

10 Claims, 17 Drawing Figures

RANDOM ACCESS FLEXIBLE DISK MEMORY

This is a continuation of application Ser. No. 958,599, filed Nov. 7, 1978.

BACKGROUND OF THE INVENTION

1. Field of the Invention

The invention relates to multi-disk storage systems in which continuously rotating closely packed flexible disks are randomly accessed.

2. Description of the Prior Art

Rotating magnetic disk memory systems and in particular rigid disk types have been used to provide large amounts of data storage capacity for computer processing. However, the operation of the rigid disk system requires a plurality of read-write transducers to be simultaneously moved to a particular radial read-write track position between the disks which has reduced the volumetric efficiency of this system.

In order to overcome the rigid disk inefficiencies by increasing the number of bits (i.e., binary information) per unit volume, compliant or flexible disks have been utilized. A random access flexible disk memory system is characterized by a closer spacing between adjacent disks but since they are compliant there is a tendency of the disk to "flop" (i.e., to move outside of its normal plane during low speed rotation). In view of the above described characteristics of the flexible or compliant disk, rapid accessing of a random disk in a stack with minimum error, that is, without having to make several selection attempts before success is obtained, is not readily obtainable.

The prior art discloses several attempts to enhance the accessing of the closely packed flexible disk memory. In patent U.S. Pat. No. 3,931,645 there is disclosed a flexible disk file wherein disks are arranged into a plurality of groups wherein each group is bounded by two disks having a maximum radius with at least two of the disks in each group having a minimum radius and at least one additional disk having an intermediate radius interposed between such minimum radius disks. Accessing of a particular disk is achieved with a partitioning arm which follows a certain weave motion. The principle of this invention is that a window is provided between two maximum diameter disks for accessing either the largest, intermediate or smallest disks by use of the weave motion.

An accessing technique for a flexible disk memory is also disclosed in an I.B.M. Technical Disclosure Bulletin, Vol. 12, No. 1, June 1969. The disk system utilizes different diameter disks which vary uniformly in a stack. A probe is utilized to move inwardly a predetermined distance to bend one or a plurality of disks downward out of its normal plane of rotation. The accessing arm which has a recording head at one end is then moved inwardly to read or record on the underside of a predetermined disk opposite the disks that have moved downward.

It should be observed that neither of the above prior art citations has the capability of reading or recording information on opposite sides of the disk without first going through another search cycle to locate the side opposite the side first magnetically written or read upon.

Other prior art such as U.S. Pat. No. 3,703,713 and an IEEE Transactions on Magnetics of September 1972 pertain to a selection scheme wherein a disk is accessed by bringing a picker to a desired radial position until it isolates the disk to be accessed from adjacent disks. The head is then moved radially inward to a desired track location on the disk. A recognized shortcoming of the selection scheme disclosed in the patent is that although there is separation between disks of approximately 60 mils, nevertheless if the disks are flopping away from the head, the disk will be missed. On the other hand, if the disks are flopping towards the head, several disks may be picked up.

The above publication although similar in operation to the patent nevertheless is distinguished therefrom by the fact that the disks of a group are in a touching relationship with one another as determined by dimensions set forth in FIG. 1 thereof. Furthermore, the disks are rotated at relatively high speed. These operational characteristics are not conductive to making a viable product in a commercial world. Thus, when the disks are in a touching relationship, wear particles that are developed during a read/write operation have no way of escaping. Wear particles are deleterious to the proper operation of the read/write cycle since they tend to ruin the disks as well as the head.

The above discussed shortcoming is also deemed to be characteristic of the above-mentioned patent since without high speeds the thin flexible disks would not become sufficiently rigid and would tend to droop and to flop. Accordingly, without a high speed rotation of the disks as shown in the patent, proper selection would not be feasible.

SUMMARY OF THE INVENTION

It is an object of the present invention to provide a random access flexible disk memory system with a faster access time than the known prior art arrangements.

In accordance with the above stated object it is an object of this invention to provide ease of locating a selected disk as the disk file is at full rotational speed.

Another object of this invention is to develop a random access flexible disk memory that is capable of storing one billion bits (a mass memory), one thousand billion bits (an archival memory) as well as memories of lesser capacity.

Still another object of this invention is to obviate the problem of compensating for tolerance build-up in prior known systems.

The above stated objects are achieved in the present invention by a technique for capturing a disk in a stack of disks with a parallel arm picker or probe wherein the arms have unequal length. The picker accesses a disk by simultaneously displacing the selected disk with the larger picker arm and the disks with a diameter larger than the selected disk with the short picker arm in a lateral or axial direction. This lateral motion causes the selected disk to orient itself between the tips of the picker arms so that it is ready to be captured. After the lateral displacement motion the picker is moved in a slightly inward radial direction which in effect captures the disk between the two arms. The unequal-parallel arm picker provides great accuracy in the random accessing process over known selection techniques.

A serious shortcoming of previously known devices of random access closely packed flexible disk designs has been that flopping or vibration of the disk and tolerance build up on locating the disk prevented accurate selection thereof. This has been a serious problem in developing a viable flexible disk random access memory system in the past. The present invention overcomes the problems of the prior art by positioning picker arms during a disk selection process significantly to the left of its normal plane of rotation to allow for axial vibrations and tolerance build up. Because of the difference of the diameter of the selected disk with respect to adjacent smaller disks, the location of the picker arms prevent the accessing of any of the adjacent smaller disks. Next in the accessing motion, the picker arms move axially to the right past the normal plane of rotation of the disk to be accessed so that the short picker arm pushes the larger disks away, and the larger arm positions the desired disk between the gap of the picker arms. At this location, the disk to be accessed is positioned beyond its amplitude of vibrations and beyond a location that might exist due to tolerance build up. Capturing the disk to be accessed now requires that the picker arms move radially inward so that the disk is trapped between the two arms. By this technique, the likelihood of accessing an incorrect disk or missing the desired disk is minimal.

The accessing technique in accordance with the invention is completed by returning the captured disk to its normal plane of rotation by a movement of the picker arms. It should be noted that selection of the largest disk of a stack is achieved by additional steps to that described above.

In view of the above-discussed selection apparatus and technique, the present invention lends itself to random selection not only of high speed rotating disks but also of low speed rotating disks, which tend to axially vibrate and flop thereby preventing reliable accessing.

DESCRIPTION OF THE PREFERRED EMBODIMENT

Figures 1, 17:
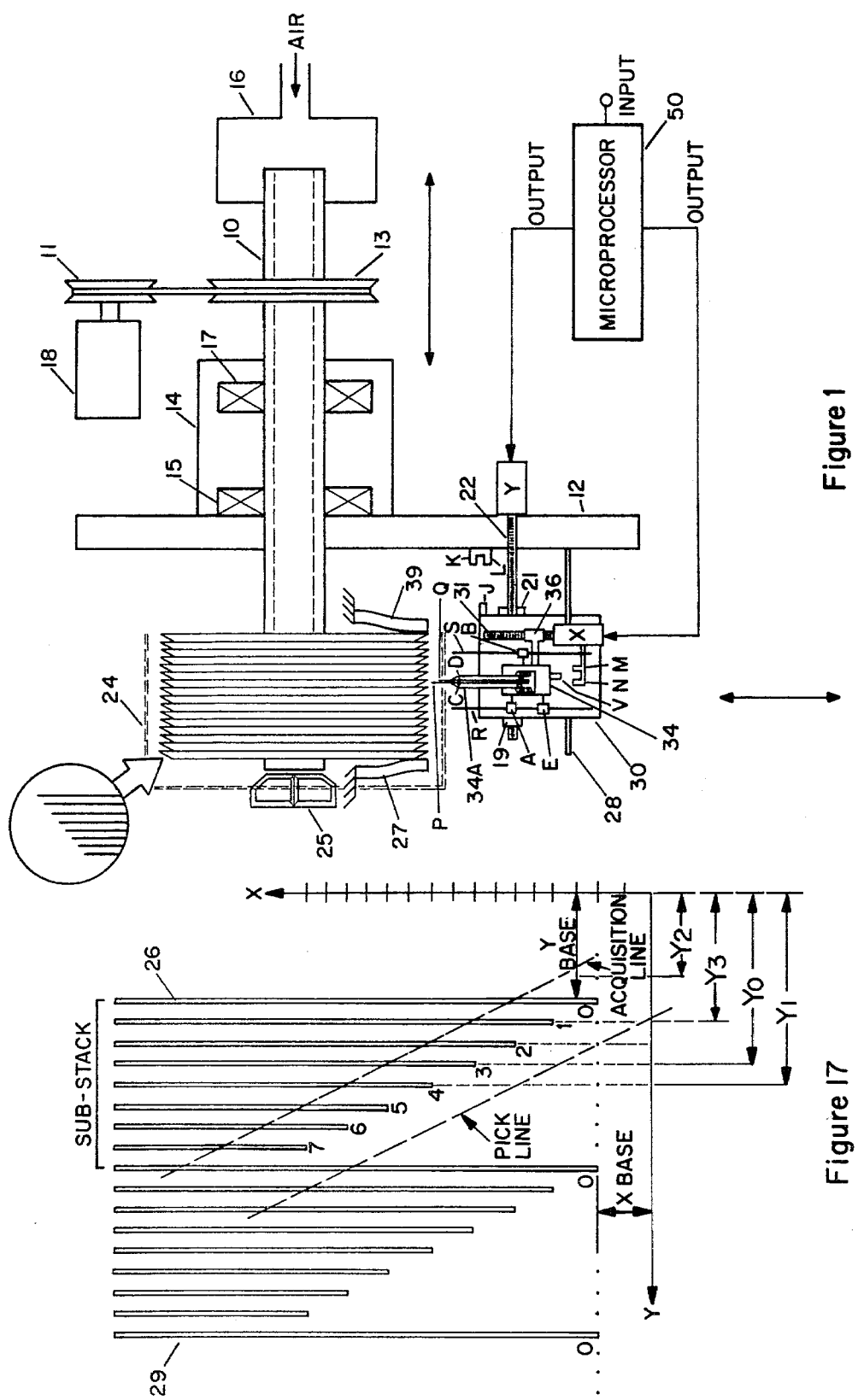
FIG. 1 is a schematic arrangement of the flexible disk memory assembly and control system of the instant invention.
FIG. 17 is an enlarged flexible disk sub-stack which sets forth the selection scheme of this invention in some detail using the microprocessor control system.

Referring now to the schematic of FIG. 1, there is shown a spindle assembly comprising a hollow shaft 10 which is attached to a vertical support plate 12. The spindle assembly also includes a bearing housing 14 for the shaft bearings 15, 17. Attached to one end of the shaft spindle assembly is the flexible disk memory pack 24. Surrounding the flexible disk pack 24 is the plastic dust cover which is shown outlined in dotted form. A handle 25 is attached to the disk pack 24 for removable purposes in the same manner as is done on present day hard disk packs. Alternatively, the disk pack 24 may be permanently attached to the shaft 10. The disk pack or stack 24 in the present invention is formed from n sub-stacks 32 wherein a sub-stack is formed of m flexible disks of different radii. In the present invention n equals 16 and m equals 8 making a total of 128 flexible disks.

The other end of the shaft 10 is connected to an arrangement of pulleys 11, 13 which cause the shaft 10 to rotate when energized by the motor 18 at a speed of 360 RPM. This speed is conventionally used with thin flexible disks although it should be understood that both higher and lower speeds may be used without any diminution in performance of this invention. The end of the shaft 10 is connected to a housing 16 which acts as a plenum for clean air supplied by a blower and a filter assembly (not shown). Clean air is supplied to the disk pack 24 through the hollow portion of the shaft.

Clean air is pumped between the disks of the disk pack for two purposes: namely, the air tends to separate and add to the stability of the disks; and it purges dirt or particles created by a magnetic head wearing against the disk. The air escapes through grooves (not shown) formed in the shaft 10 where the disk pack is located.

Air foil bearing plates 27, 39 are located in proximity to the surface of the outer disks of the disk pack 24 in order to help stabilize the disks. The plates 27, 39 are not completely stiff so as to appear to the outer floppy disks as if they were a continuation of additional disks.

A carriage assembly 30 is also referenced to the support plate 12. The carriage assembly 30 includes the parallel arm pickers or probes P, Q which are parallelly supported by a picker moveable support member 34. The member 34 is mounted on bearings A, B and E which rides on the rails R, S.

Motion of the carriage 30 and the picker arms P, Q in the axial direction (shown by the horizontal arrows) is achieved by energizing a stepping motor Y which causes the threaded lead screw 22 to engage threaded nuts 19, 21 which are attached to the carriage 30. A lead screw 31 which is coupled to a stepping motor X engages the threaded arm extension 36 which is attached to the member 34. Hereinafter lateral movement of picker assembly 34A caused by the energizing of the Y stepping motor will be referenced to the axial or Y direction (shown by a horizontal arrow), whereas movement of the assembly 34A by the energizing of the X stepping motor, which is located directly on the carriage assembly 30, will be referenced to the radial or X direction (shown by a vertical arrow). In the present embodiment, the X and Y stepping motor are controlled by a microprocessor 50. It should be understood that "hard wired" techniques using relays, limit switches, motor driven gearing, etc. might also be utilized to provide the selection technique discussed herein. Microprocessor 50 which is composed of integrated circuit chips, is similar to a computer system but without input peripherals (e.g., punched cards and punched card readers) and output peripherals (e.g., printers and CRT displays). The microprocessor 50 which is utilized in the present invention is based on an Intel 8080 chip, which is well known in the computer industry. The microprocessor 50 is programmed in assembly language a listing of which is incorporated herein and is stored in either a ROM (read only memory) chip PROM (programmable read only memory) chip or RAM (random access memory) chip. The execution of the steps of the program when processed for any particular disk selection produces electrical pulses for the X, Y stepping motor to thereby cause the motion of the picker arms P, Q to move in certain sequences as described herein. Each electrical pulse produces a rotational change of one step of the motor shaft.

Figure 2:
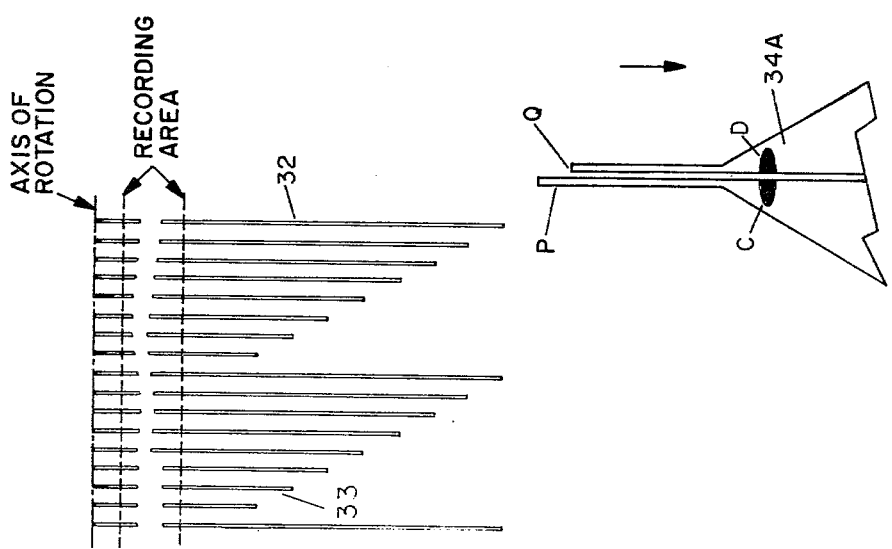
FIG. 2 depicts the flexible disk memory sub-stack having different diameter disks which are arranged in an ascending order wherein the parallel arm disk picker or probe is positioned in a fully retracted position in an axial and radial direction, which is designated as home X,Y.

The sub-stack 32 of the disk pack 24 is shown in greater detail in FIG. 2. In the instant embodiment, the sub-stack 32 utilizes eight magnetic flexible recording disks wherein each has a thickness of 3.2 mils. A spacer of 16.8 mils (not shown) is provided between each disk in order to separate the respective disks in a stack so that the disks are arranged on 20 mil centers. The width of a sub-stack is approximately 160 mils.

The disks of the sub-stack 32 are arranged uniformly in an ascending order. The largest diameter disk of a sub-stack is approximately 7.875 inches and the smallest diameter is 7.287 inches. The recording area on each disk occupies a space of 1.6 inches. The radius of each disk from the smallest to the largest increases uniformly by steps of approximately 0.042 inches. The magnetic recording area surface for reading and/or recording information is encompassed between the two dotted lines and comprises a total number of 154 tracks per disk or 77 tracks per surface. By using a double density recording technique, each disk would have a storage capacity of $1.28 \times 10^7$ bits of information or 83,328 bits per track. A memory in accordance with this invention having 128 disks would have a total bit capacity of approximately 200 megabytes.

The tapered picker or probe assembly is attached to the carriage member 34. The outside surfaces of the picker assembly 34A constitute air foils to minimize wear between adjacent disks to the disk to be accessed and the picker assembly. Extending from the tapered end of the picker assembly 34A are two parallel but unequal length metal members P, Q which can be positioned in radial alignment with any disk of the disk pack 24. The two metal members P, Q are made from 7 mil stainless or brass flat stock and are assembled with a 13 mil opening. The difference in length between the parallel arms P, Q is 42 mils. This difference is significant since it will be recalled that the difference in radius of two adjacent disks is 42 mils. Magnetic read/write transducers C,D are located within a body of the picker arm assembly 34A. The heads C,D remain retracted during the selection process so as not to damage individual disks during accessing. The head C,D are released for a read or write cycle when a desired disk track has been located. Accessing of a disk and location of a specific track on the disk will be discussed in greater detail hereinafter. It should be understood that only one transducer might be used in this arrangement. These transducers are electrically connected to appropriate electrical apparatus (not shown) for developing signals which alternately read and record information on either side of the respective disks. The picker arms P, Q are shown in FIG. 2 in a radial home position. The radial Home X position of the picker is a position wherein the arms P, Q have just completed disk selection in a sub-stack opposite the arms (not shown) and are about to make a disk selection in a new disk sub-stack. In other words, the picker arms have moved completely downward in order to clear the sub-stack (not shown) directly opposite after having executed a read or alternatively write cycle on a particular disk. It should be noted hereat that when the picker arms P, Q are fully retracted in both the radial direction as well as in the axial direction, this position would be designated herein as Home X,Y. By way of example, if sub-stack 32 were designated as the number one stack, the position of the picker assembly 34A would be designated as Home X,Y since it is fully retracted in the axial and radial position. The Home X, Y and Home X are significant because they provide reference positions used in the selection process.

Figure 3:
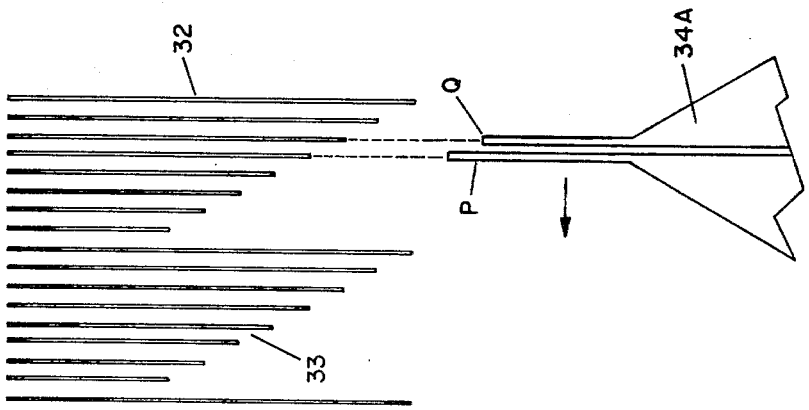
FIG. 3 shows a position of the picker as it is laterally moved from the position shown in FIG. 2 in order to position opposite a selected disk sub-stack and is designated as a Home X.

FIG. 3 depicts a lateral movement in the axial direction (from right to left) to bring the picker arms P, Q to a Home X position for making a disk selection in a sub-stack directly opposite the arms. The right to left lateral movement to the new Home X position is achieved by an appropriate output signal produced by the microprocessor 50 which causes the Y motor to be stepped to the desired sub-stack. In the home position, the picker arms P, Q are being readied to select the largest disk of a sub-stack.

Figure 4:
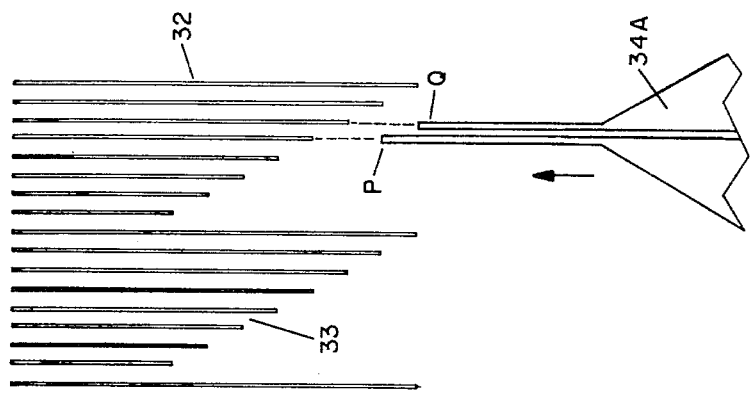
FIG. 4 illustrates an upward movement of the picker from the Home X position shown in FIG. 3 to the entry point of the selected sub-stack.

Referring now to FIG. 4, there is shown an operation wherein the picker assembly 34A including the picker arms P, Q are moved in a radial upward direction to an entry position of the sub-stack 32 from the position shown in FIG. 3 by an energizing of the X motor via the microprocessor 50 output. The radial upward movement of the picker assembly 34A brings the picker arms P, Q in a position to enter the selected sub-stack and this step is referred to hereinafter as "Move X to $\phi$ (i.e., zero) co-ordinate". At the $\phi$ co-ordinate, the picker arms P, Q are positioned to select the largest disk of sub-stack 32. The tips of the longer and shorter arms are located radially outward 10 mils from the outer edges of the next to largest and largest disks, respectively.

Figure 5:
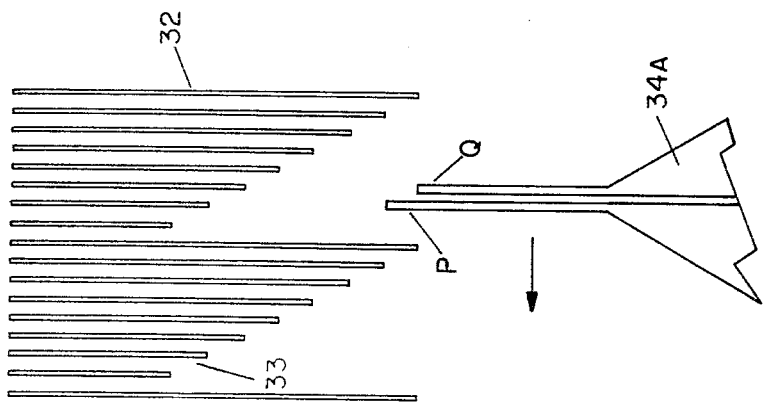
FIG. 5 shows a lateral movement of the picker from the position shown in FIG. 4 in order to select a fourth largest disk in the sub-stack.

Reference is now made to FIG. 5 wherein it is shown that the microprocessor 50 causes the probe assembly 34A to move laterally in the axial direction from the $\phi$ co-ordinate position shown in FIG. 4 to a new position for selecting the fourth largest disk in the sub-stack 32. The picker assembly 34A is moved such that the shorter arm Q remains at the same radially outward position depicted in FIG. 5 as it is transferred along the Y direction to what is referred to as a pick point co-ordinate. The axial movement in the Y direction to the pick-point co-ordinate is obtained by energizing the Y motor with the microprocessor 50 output signal.

Figure 6:
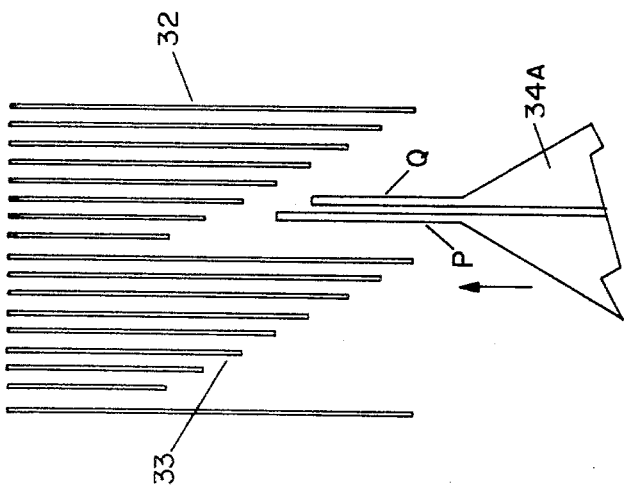
FIG. 6 depicts an upward movement of the picker from the position shown in FIG. 5 in order to select the fourth largest disk.

FIG. 6 indicates a movement in the radial or X direction by the picker assembly 34A from the position shown in FIG. 5 in order to select the fourth largest disk of the sub-stack 32. The movement is developed by energizing the X motor via the microprocessor 50 output. At this point of time in the disk selection process, the picker arms P, Q are located radially outward 10 mils from the outer edges of the fifth and fourth disk diameters, respectively. The radial movement in the X direction to the position described immediately above will be referred to hereinafter as moving in the X direction to a pick point co-ordinate.

It should be noted in FIGS. 5, 6 that the pick point co-ordinate during accessing is 40 mils leftward of the fourth largest disk's plane of rotation. This position of the picker arms P, Q is such that it is beyond the disk's amplitude of vibration as well as beyond a disk location that may exist due to a tolerance build up incurred during manufacturing. As is understood, because of the close packing of the disks in a stack together with the tendency of each disk to flop a tolerance build up in the selection apparatus would prevent a random accessing device from operating successfully. The present invention eliminates such a possibility.

Figure 7:
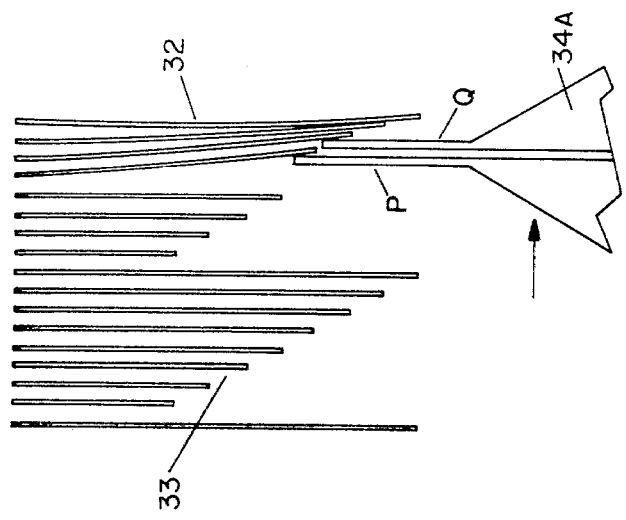
FIG. 7 further depicts the effect of a lateral movement of the picker with respect to the position shown in FIG. 6 to position the fourth largest disk between the tips of the picker.

Referring now to FIG. 7 there is shown a movement in the Y or axial direction via the microprocessor 50 output signal wherein the picker arm P moves the fourth largest disk of the sub-stack 32 out of its plane of rotation and nearly simultaneously the picker arm Q moves the remaining largest disks of the sub-stack out of their respective planes of rotation. This movement will be referred to hereinafter as a movement in the Y direction to an acquisition point. As can be readily appreciated, the movement by the picker arms P, Q to the acquisition point aids in the selection process by removing the fourth largest disk from the smaller disks of the sub-stack whereas the larger disks are separated from the selected disk (i.e., the fourth largest disk) by the shorter picker arm Q. In effect, the step shown in FIG. 7 isolates the fourth largest disk from the remaining disks of the sub-stack in order to prevent error in the selection or accessing process.

Figure 8:
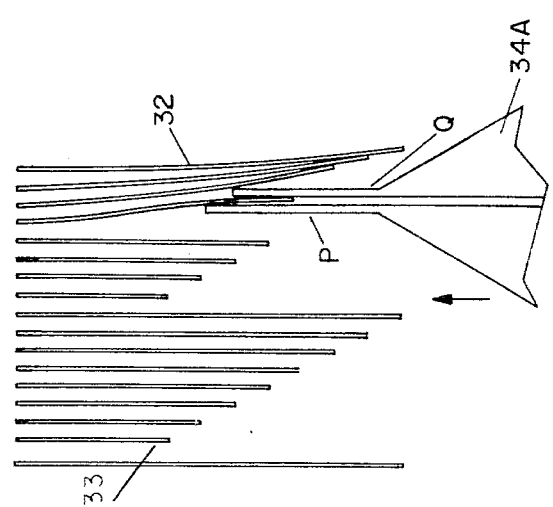
FIG. 8 is a view showing the capture of the accessed disk between the picker arms by moving the picker upwardly from the position shown in FIG. 7.

FIG. 8 depicts a step wherein the fourth largest disk is captured between the picker arms P, Q whereby the selected disk cannot escape and therefore is effectively selected. This is accomplished by a movement in the radial direction from the position shown in FIG. 8 by the output signal generated by the microprocessor 50.

Figure 9:
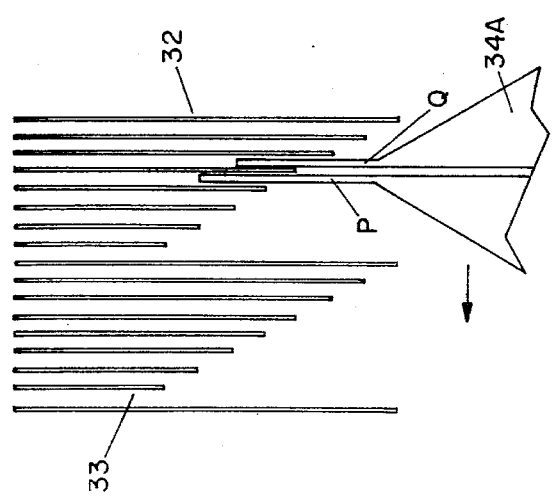
FIG. 9 shows the captured disk brought back to its normal plane of rotation.

FIG. 9 indicates the step following the step of FIG. 8 wherein under the control of the microprocessor 50 the captured disk is moved in the Y or axial direction so that it is brought back to its plane of rotation. At this point in time the picker arms or probes P, Q have moved the selected disk into radial alignment.

Figure 10:
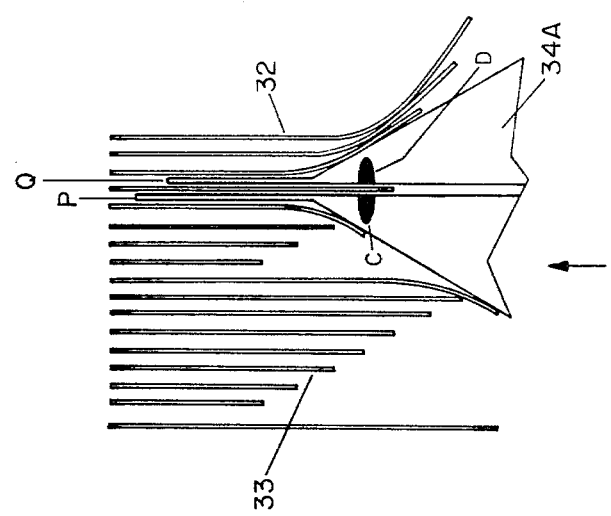
FIG. 10 is a view showing an upward movement from the position shown in FIG. 9 wherein retractable read/write heads in the picker are moving radially inward to a desired disk track.

FIG. 10 depicts an upward radial inward movement of the picker arms P, Q into the sub-stack 32 in order to bring the read/write heads C, D (FIG. 2) in juxtaposition to either a desired track location on the recording area (FIG. 2) or to the φ (zero) track (i.e., the first of 77 recording tracks). This step is performed under control of the microprocessor 50. In the present embodiment, the upward movement of the picker arms P, Q so as to bring the read/write heads C, D contiguous the φ or other predetermined recording track causes a simultaneous parting and deforming of the disks adjacent the selected disk out of their respective planes of rotation. After the head is lowered (i.e., placed in contact with the disk) and the read or alternatively the write cycle is completed on the selected disk, the head is raised and the picker motion following is dependent upon whether a disk in a new sub-stack is to be selected, or alternatively, a new track on the selected disk (i.e., the fourth largest disk in sub-stack 32) is to be selected, or a different disk in the same sub-stack 32 is to be selected. These alternatives will be discussed in greater detail when discussing the algorithm shown in FIG. 17 which is solved by the microprocessor control 50.

The operation for selecting the largest disk of a particular sub-stack is different from the process for selecting the seven smallest disks.

Referring again to FIGS. 3, 4 it will be recalled that FIG. 3 depicts the position of the picker assembly 34A so that the parallel arms P, Q are at the Home X position for selecting the largest diameter disk, and FIG. 4 indicates the movement in the radial direction from the position shown in FIG. 3 wherein the picker arms P, Q are moved radially to the φ (zero) co-ordinate or the entry point from the position shown in FIG. 3 (i.e., the arms P, Q are positioned approximately 10 mils radially outward from the second largest and largest disk of the sub-stack, respectively).

Figure 11:
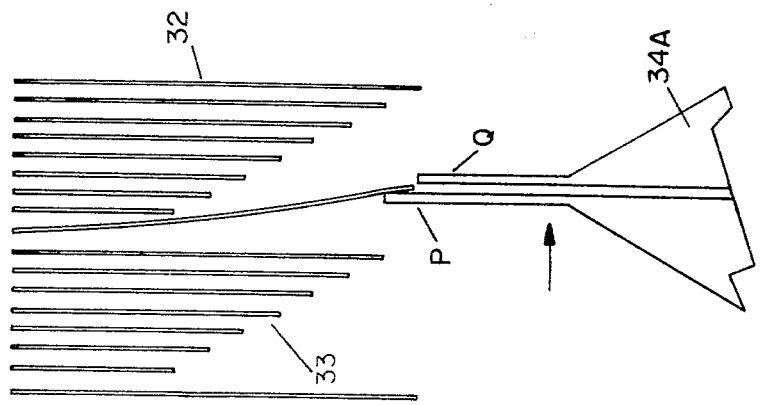
FIG. 11 is a view showing an acquisition of the largest disk of a sub-stack by a lateral movement from the position shown in FIG. 4.

FIG. 11 depicts a microprocessor 50 controlled lateral movement of the picker arms P, Q with respect to the largest disk of sub-stack 33 from a position identical to that shown in FIG. 4, which is shown positioned at the φ co-ordinate for selecting the largest disk of sub-stack 32. The movement of the picker arms P, Q in FIG. 11 in the axial direction is to an acquisition point and is similar to that shown in FIG. 7 with respect to the selection of the fourth largest disk of sub-stack 32.

Figure 12:
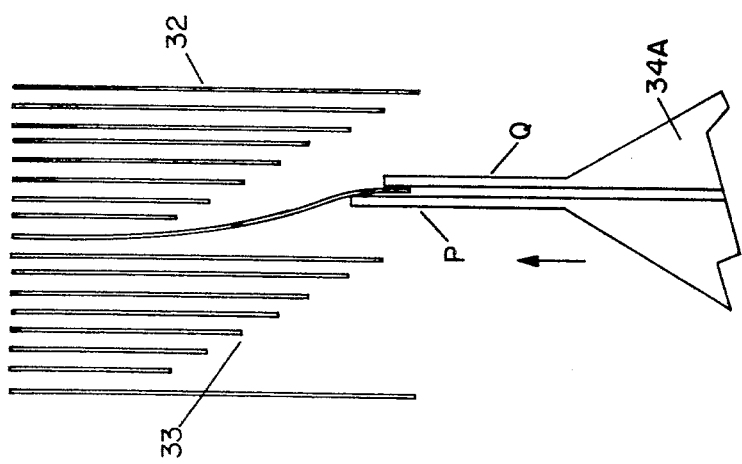
FIG. 12 is a view showing a capture of the largest disk by an upward movement from the position shown in FIG. 11.

Referring now to FIG. 12 there is shown a microprocessor 50 controlled radial movement from the position shown in FIG. 11 wherein the rotating disk is captured between the parallel picker arms P, Q. In this position, the largest disk cannot escape and hence corresponds to the disk capture described with respect to FIG. 8. After the largest sub-stack disk is brought to the acquisition line, it is returned to its normal plane of rotation by the microprocessor 50 control and the center of the picker arms P, Q are in radial alignment with the disk. This step is not shown but corresponds to the operation described with respect to FIG. 9.

Figure 13:
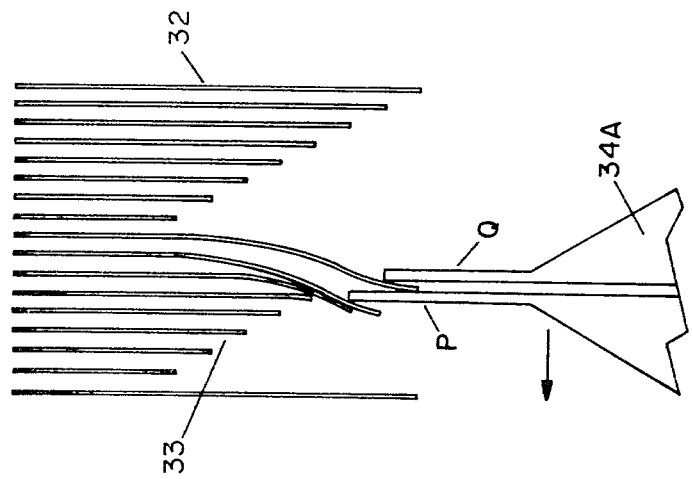
FIG. 13 is a view showing a leftward lateral movement of the largest disk following capture thereof.

However, in selecting the largest disk of a particular sub-stack, the selection technique under control of the microprocessor 50 changes with respect to the selection operation for the seven smaller disks of a sub-stack as described with respect to the fourth largest disk. This change is shown in FIG. 13 wherein the largest disk is moved axially by the Y motor under control of the microprocessor 50 in a direction opposite from that shown in FIG. 11. The reason for this axial movement will become clearer below.

Figure 14:
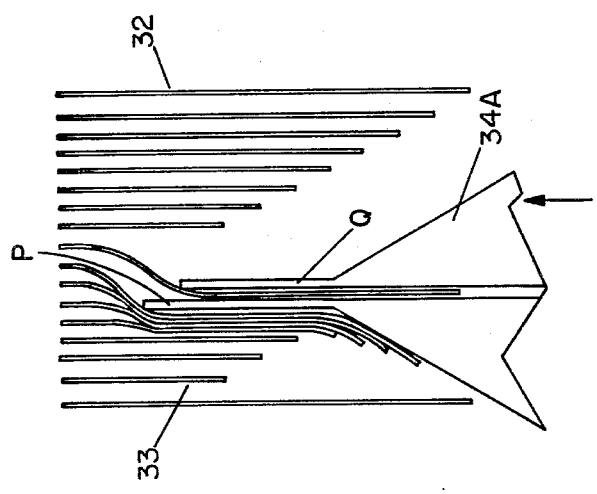
FIG. 14 is a view depicting an upward movement of the picker in order to clear the smallest disk.

FIG. 14 illustrates a radial movement of the picker or probe assembly 34a including the picker arms P, Q by energizing the X stepping motor via the microprocessor 50. The picker arms P, Q are moved a distance which is sufficient to clear the smallest disk of sub-stack 32. By this procedure the radial movement of the picker arms P, Q will eliminate the possibility of capturing the smallest disk of sub-stack 32 where an intent is to capture the largest disk of sub-stack 33.

Figure 15:
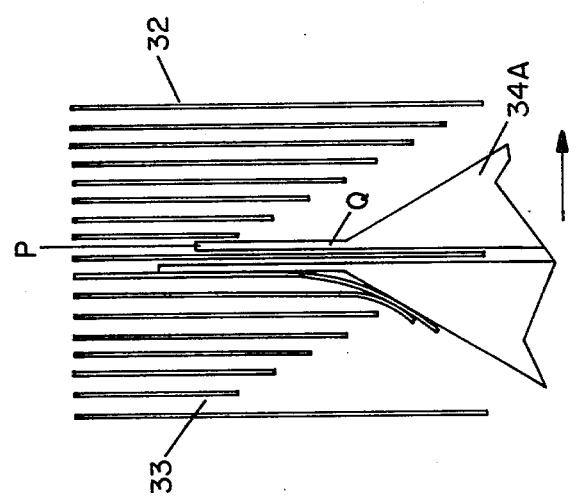
FIG. 15 is a view showing a lateral movement of the picker to the right wherein the largest disk is aligned into its normal plane of rotation.

After the picker arms P, Q have been moved in the radial direction to clear the smallest disk of an adjacent sub-stack, they are moved axially by energizing the microprocessor controlled Y motor to bring the largest disk within its plane of rotation (i.e., into radial alignment) as shown in FIG. 15. The picker assembly 34A is then moved radially by energizing the X motor via the microprocessor 50 so that the read/write transducers C, D (FIG. 2) are brought into juxtaposition with the φ track or one of the other 77 tracks desired. This operation is identical with that shown in FIG. 10.

Figure 16:
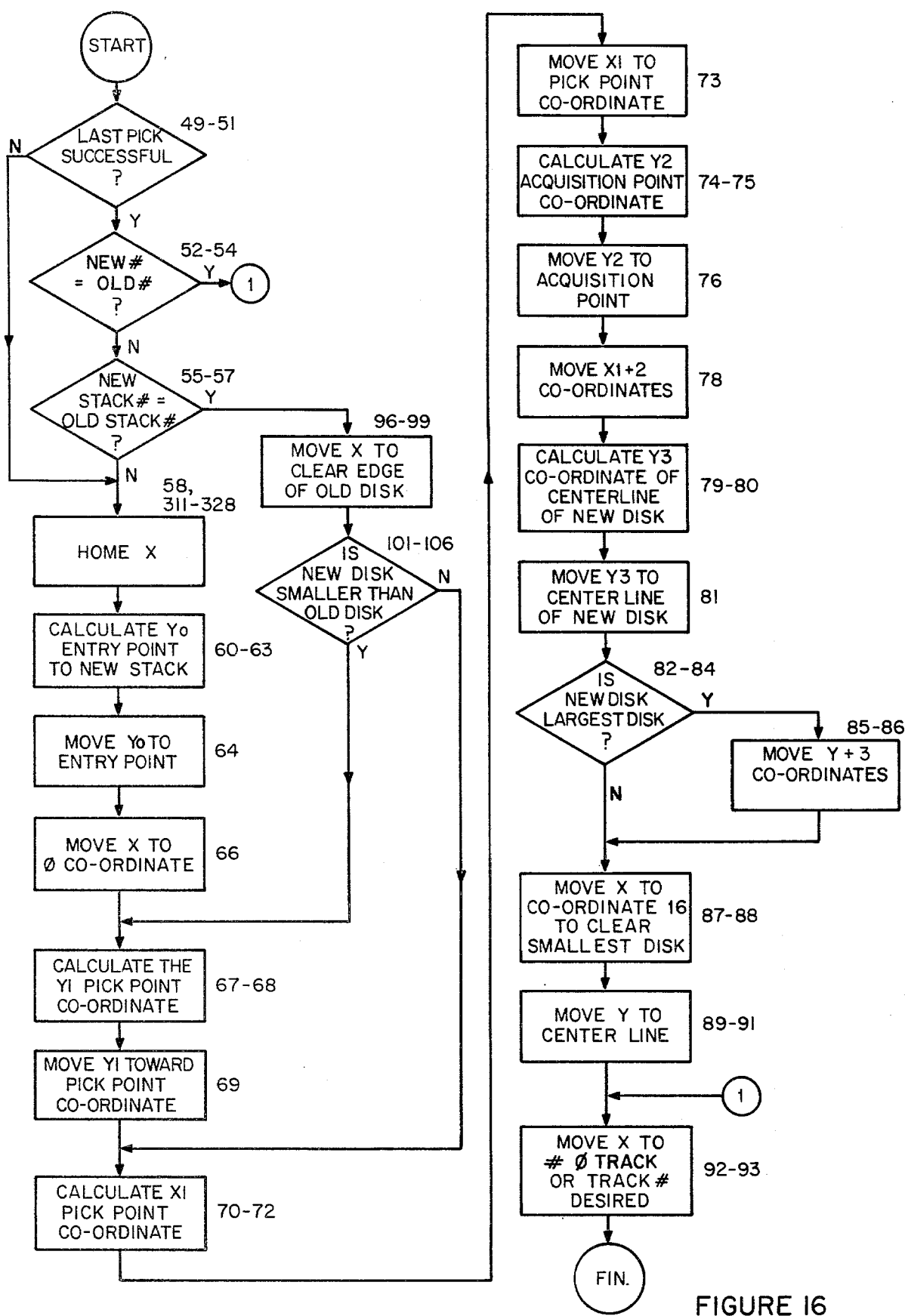
FIG. 16 manifests a softwave flow chart for an algorithm utilized with the microprocessor control system of this invention.

Reference is now made to FIG. 16 which illustrates the algorithm or procedure used to develope the disk selection technique above described. Software is included herein for programming the microprocessor 50 (FIG. 1) in order to achieve the various steps of the algorithm.

FIG. 17 is a detailed view of a flexible disk sub-stack in accordance with this invention. FIG. 16 will now be discussed in combination with FIG. 17 in order that the selection scheme may be more fully comprehended.

An imaginary line (not shown) that may be drawn through the outer edges of the disks is designated as a disk edge line. A line 40 mils (i.e., each increment on the Y axis is 20 mils) leftward of the imaginary disk edge line which intersects the Y axis and is parallel thereto is designated as a pick line. Similarly, a line 40 mils from the imaginary disk edge line which intersects the Y axis but on the opposite side is designated as an acquisition line. The location of the pick and acquisition lines are determined by a requirement of the disk selection process to overcome normal or natural vibration, or tendency to flop in addition to any mislocation due to tolerance build up of the respective disks when they are being rotated. In other words, normal or natural vibration is an inherent flutter that occurs in an operating range of the machine, and this is taken into consideration during the selection process. The X base and Y base distances shown on the drawing define fixed distances from the X and Y axis of the largest disk of a sub-stack. It should be noted that the X and Y base distances are not drawn to actual proportion in FIG. 17 since these distances may vary in accordance with the physical dimensions of the machine. The X and Y base distances are inserted as parameters into the software which operate the microprocessor 50 and are found at lines 356-363 together with other parameters at lines 356-363 of a program listing provided herewith as an Appendix. The microprocessor as utilized in this invention enables design changes to be easily accommodated by merely changing input software parameters.

The intersection of the X and Y axes define a reference point for determining the X and Y base distances. This intersection is mechanically determined by sensors which are positioned to detect when the X and Y motors are in their fully retracted position. When the X, Y motors are fully retracted, the carriage 30 is in a home position (actually, the home X, Y position). In the present embodiment when the carriage 30 is in the fully retracted position a light beam will be broken by an opaque arm member J located on the carriage 30 which slides between a photodiode K which emits a light beam and a photo transistor L which detects when the light beam is present or absent. Similarly, when the member 34 is in the fully retracted position, an opaque arm V will intercept a light beam from a photodiode N that is directed to a photo transistor M. Alternatively, when the carriage is not in the home position the two light beams will not be broken. The X and Y base distances are physically measured when the carriage 30 is in the home position and these parameters are utilized in the software program for the microprocessor 50 hereinafter provided.

Let us again assume that under control of the microprocessor 50 the number 3 (the fourth largest) disk of the eleventh of sixteen sub-stacks is to be selected. The selection process is initiated by inserting a desired disk number into an input terminal of the microprocessor 50 (FIG. 1) via a software program that is stored in its RAM (Random Access Memory) or a ROM (Read Only Memory). The first disk of the disk pack memory 24 (FIG. 1) is the rightmost disk and is numbered zero. In like manner, the rightmost sub-stack is numbered zero. Therefore, the number of each largest disk of a sub-stack is a multiple of eight. This facilitates the calculation of sub-stack and disk location by the binary oriented microprocessor 50. In our example, the number 3 disk of the eleventh sub-stack is numbered 83 (sub-stack number or 10×8+disk number or 3). The insertion of the disk number into the microprocessor 50 is indicated in the flow chart 16 at the START position.

Following the insertion of the disk number, a determination is made on whether the last disk picked was successful. If a Yes (Y) is produced at this point in the algorithm a comparison is then made between the old number (i.e., the old sub-stack and disk number) and the new number (i.e., the new sub-stack and disk number. In the example under consideration, a comparison would be made between an old number and the new number 83. If an equality is produced, that is, both numbers are 83 the picker 34 has already selected disk number 3 and the selection process branches to 1 . Therefore, all that remains is for the read/write transducer C, D (FIG. 2) to be re-positioned on a desired recording track by moving the picker arms P, Q a required radial distance on the X axis. This is accomplished by energizing the X stepping motor (FIG. 3) for a required number of steps by means of the microprocessor 50. This is the significance of branch 1 on the flow chart to the operational step "Move X to Track #φ or Track # Desired". In other words, if the old disk number is equal to the new disk number the picker assembly 34A will be reoriented on the same disk to a new recording track only. When this step is completed, the operation of the algorithm is finished (i.e., FIN). However, if the last disk pick was not successful, the algorithm branches to "Home X". The significance of this branch will be discussed in later paragraphs.

On the other hand, if the old and new numbers do not correspond a comparison is made between the new sub-stack number and the old sub-stack number. In our example the algorithm next checks if sub-stack number 10 is the same as the old sub-stack number. If the new sub-stack and the old sub-stack are the same, the picker assembly 34A will be moved so that arm P is positioned just outside the edge line. This is the significance of the flow chart block designated as "Move X To Clear Edge Of Old Disk". This step is accomplished by the microprocessor 50 producing electrical signals which energize the radial stepping motor X so that the picker arms P, Q are brought to the edge line (i.e., an imaginary line which intersects all edges of a sub-stack). Therefore, the algorithm is designed to enable the microprocessor 50 to control the picker 34A so that it remains in close vicinity of the sub-stack 10 when the old and new sub-stacks are identical. As can be readily appreciated this aspect of the control function improves disk access time since the picker 34 remains in the sub-stack rather than returning to some position outside of the sub-stack.

The flow chart of the algorithm next indicates that the sequence of operations is such that a determination is next made on whether the new disk (i.e., the fourth largest disk or disk number 3 of sub-stack 10) is smaller than the old disk. If it is not (i.e., N) the algorithm indicates that the operation branches to "Calculate X1 Pick Point Co-ordinate". The significance of this branch will be discussed in later paragraphs. On the other hand if the determination is Yes (i.e., Y) the flow chart indicates that the operation moves to a program sequence entitled "Calculate The Y1 Pick Point Co-ordinate". This sequence will also be discussed in a later paragraph.

Let us assume for the moment that the new stack number 10 does not correspond to the old stack number and the flow chart of the algorithm follows the N path to a "Home X" block. The significance of "Home X" is that the microprocessor 50 produces signals which activates the X stepping motor to move the member 34A radially downward so that the picker arms P, Q are out of the old sub-stack and X motor is in the fully retracted position. This is to be contrasted with the "Home Position" when the X and Y motors are in the fully retracted position. By way of example, the old sub-stack number is 9 which is adjacent to the new sub-stack number 10. In other words, in the "Home X" position the picker arm is now out of the old disk sub-stack (not shown) and the carriage 30 is ready to be moved by the microprocessor to the new sub-stack 32. FIG. 2 depicts the "Home X" position of the picker arms P, Q for an adjacent sub-stack 32 in accordance with our example and further depicts the above mentioned example where the picker arms have moved out of the sub-stack number 9 and is in a condition to move to a new sub-stack, namely, sub-stack number 10.

The flow chart for the disk selection algorithm next indicates an operation identified as "Calculate Y0 Entry Point To New Stack". This block signifies that the microprocessor 50 calculates where the picker assembly 34A is to be positioned for the largest disk selection with respect to the newly selected sub-stack 10. The Y entry point to a new stack will always be such so that the picker arms P, Q are prepared to select the largest diameter disk of a sub-stack.

The block "Move Y0 To Entry Point" in the flow chart signifies that the microprocessor causes the Y motor to be energized to move the picker arms P, Q to the Y entry point. This step is shown in FIG. 3.

The flow chart of the algorithm next indicates a "Move X to φ Co-ordinate". In this sequence of the operation, the picker arm 34 is moved radially upward from the sub-stack entry point (see FIG. 4) so that the longer arm P is 10 mils radially outward of the second largest disk and the shortest arm Q is 10 mils radially outward of the largest disk of a sub-stack. In this position, the picker is at a position to select the largest disk. The above-described position of the picker arms P, Q is referred to as the φ (zero) X co-ordinate and will be discussed in more detail hereinafter.

The algorithm next indicates that the microprocessor 50 "Calculates the Y1 Pick Point Co-ordinate" for the disk to be selected (i.e., the fourth largest disk). This step signifies that a calculation is made on how far the picker assembly 34A must be moved axially from the stack entry point (see FIGS. 3, 4) in order to select the fourth largest disk of sub-stack 32. It is seen that this operational step is also performed after a determination has been made that the new disk selection is smaller than the old disk and that the selection is to be made in the same sub-stack (i.e., the "New Sub-stack Equals The Old Sub-Stack"). In other words, when a smaller disk is to be selected in the same sub-stack from a previously selected larger disk, a calculation is made by the microprocessor 50 to determine the axial distance from the present position in the sub-stack which is required to pick the smaller new disk.

According to the next operational step, namely, "Move Y1 Toward Pick Point Co-ordinate" the microprocessor 50 energizes the Y motor (FIG. 1) to move the arm P axially to a location in order to select or pick disk number 3 (the fourth largest disk) of sub-stack 10 or the new smaller disk in the same sub-stack as the case may be. This step is depicted in FIG. 5.

The next step of the algorithm for disk selection is "Calculate X1 Pick Point Co-ordinate" which is the remaining co-ordinate to be determined for selection of disk number four. The significance of this step is that a calculation is made to determine how far inward or radially the picker arms P, Q must be moved to select the fourth largest disk. After this calculation is made the microprocessor 50 moves the arm P to a position as shown in FIG. 6 wherein the longer arm P and the shorter arm Q are approximately 10 mils radially outward from the fifth largest disk and the fourth largest disk respectively.

It should be noted that the step of "Calculating the X1 Pick Point Co-ordinate" also occurs when different disks are to be selected in the same stack and the new disk to be selected is larger than the old disk. In this particular situation after the microprocessor 50 has calculated the X1 pick point co-ordinate, the picker arms P, Q will be moved radially downward from its previous position which cleared the edge of the old disk to a position on the X axis to access the new disk. It should be noted that this loop is included in the algorithm to save time since it eliminates the necessity of recalculating the Y entry point as well as moving to the Y entry point and moving to the X co-ordinate.

Following the move to the X1 pick point the microprocessor 50 calculates a Y acquisition point co-ordinate for disk 3 or the new disk in the same sub-stack as the case may be. It will be recalled that the acquisition line is an imaginary line 40 mils rightward of the imaginary line through disk edges. The acquisition point is a co-ordinate on the acquisition line. After this calculation the picker arms P, Q are moved to an acquisition point as shown in FIG. 7. At this point in the selection algorithm, disk number 3 will be between the tips of picker arms P, Q.

The next step in the flow chart of the algorithm requires a "Move X1+2 co-ordinates". The movement in the X or radial direction is such that it enables the picker assembly 34A to capture disk number 4 between arms P and Q so that it cannot escape and is shown in FIG. 8. At this point in the algorithm the position of the picker assembly 34A prevents the possibility of an accidental selection of any adjacent disk between the picker arms P, Q.

The flow chart next performs the step identified as "Calculate Y3 Co-ordinate of Centerline of New Disk". After this calculation is performed by the microprocessor 50 the latter energizes the Y motor to bring the captured disk back within its plane of rotation in accordance with the next step of the algorithm identified as "Move Y3 to Centerline of New Disk". This step is shown in FIG. 9.

The algorithm then indicates that a determination is made whether the captured disk is the largest diameter disk. It will be recalled that in the example under discussion disk number 3 was obtained by dividing 83 by 8 which resulted in a quotient 10 and a remainder of 3 (i.e., the fourth largest disk of the eleventh sub-stack). Had the remainder been 0 it would have signified that disk being selected was the largest disk. This determination is accomplished in the microprocessor 50 in the following manner. The binary representation of any of the largest disks of the sixteen sub-stacks will have its loworder three bits 000. Thus the microprocessor 50 can inspect these three bits and determine the diameter of any disk.

Referring again to the flow chart of FIG. 16, if the largest diameter disk has not been captured, then the microprocessor 50 will energize the X motor in order to move the member 34A radially to the "Track $\phi$" or alternatively to any of the remaining 76 tracks. The operation is shown in FIG. 10. This is accomplished in the last three boxes of the flow chart. (The box "Move Y to Center Line" is redundant in this case.)

Let us now return to the loop in the flow chart wherein a determination is made that the new disk is the largest diameter disk selected. It should be noted hereat that up to this point in the algorithm the selection of the largest disk of a particular sub-stack will be the same as the selection process for any of the seven smaller disks. For example, there is depicted in FIG. 11 the movement of the picker arms P, Q to the acquisition point in a sub-stack 31 which is contiguous to sub-stack 32. In other words, the step shown in FIG. 11 is identical to the step shown and describe with respect to FIG. 7. FIG. 12 illustrates the large disk capture step and is similar to the operation described with respect to FIG. 8. As was previously discussed, the step of aligning the disk into its plane of rotation is not shown but this step is identical to that shown and described with respect to FIG. 9.

When the microprocessor 50 has determined that the new disk is the largest disk the loop in the flow chart of the algorithm indicates that the step of "Move Y+3 Co-ordinates" is performed. The significance of this step is that after the largest disk of a sub-stack is aligned in its plane of rotation in a manner similar to that shown in FIG. 9 for a smaller diameter disk, the microprocessor 50 will energize the Y motor to move the picker arms P, Q axially in a direction opposite from that shown in FIG. 12. The significance of this axial movement will become clearer hereinafter.

Having moved the largest disk axially as just described the next step in the algorithm is identified as "Move X to Co-ordinate 16 to Clear Smallest Disk". The step is shown in FIG. 14 and represents a radial movement by the picker arms P, Q, which has captured the largest disk of sub-stack 33, with respect to the smallest disk of sub-stack 32. The algorithm proceeds in the fashion above-described with respect to the selection of the largest disk of a sub-stack in order to avoid the possibility of capturing the smallest disk of an adjacent sub-stack when the picker arms P, Q move radially to the recording area.

Once the ends of the picker arms P, Q have cleared the smallest disk of the sub-stack 32 the next step of the algorithm is to "Move Y to Center Line" by energizing the motor Y via the output of the microprocessor 50. By this step the selected largest disk shown in FIG. 14 is radially aligned into its plane of rotation as shown in FIG. 15. After the largest disk is aligned into its plane of rotation, the picker arm is radially moved either to the $\phi$ track or the track number desired. As will be recalled this last step of the algorithm is to ultimately juxtapose the read/write heads C, D (FIG. 2) to one of the 77 tracks of the recording area. This step of the algorithm is identical to that shown in FIG. 10.

Turning now to FIG. 17, which is a detailed view of several flexible disk sub-stacks 26, 29 which are considered as the first and second sub-stacks of the n sub-stacks forming the disk pack 24 (FIG. 1) which are positioned with respect to imaginary X (radial) and Y (axial) axes. The sub-stack 32 (FIGS. 2-10) is the eleventh sub-stack of n such sub-stacks and its position with respect to the X, Y axes will be discussed below. The flexible disk sub-stacks 26, 29 are positioned a certain distance from the X, Y axes identified respectively as X base and Y base distances. Particularly, the X and Y base distances define fixed distances from the X and Y axis of the largest disk of a sub-stack. It should be noted again that the X and Y base distances are not drawn in precise proportion since these distances may vary in accordance with the physical dimensions of the equipment. The X and Y base distances are inserted as software parameters into the microprocessor 50 and therefore can be readily set to the machine's actual design dimensions.

As was previously mentioned, an imaginary oblique line that may be drawn through the outer edges of the disks of a particular sub-stack which intersects the Y axis is designated as a disk edge line. A parallel line 40 mils (i.e., each unit on the Y base line is 20 mils) from the disk edge line which also intersects the Y axis is known as the pick line. Similarly, a line 40 mils from the disk edge line and parallel thereto but on the opposite side of the disk edge line is known as the acquisition line. The locations of the pick and acquisition lines are determined by the necessity of the disk selection process to overcome the vibration of the flexible disks to vibrate or flop.

The intersection of the X and Y axes define a reference point for determining the X and Y base distances. This intersection is mechanically determined by an optical switch arrangement comprising a photodiode which emits a light beam when properly activated, and an oppositely located photo sensor transistor which detects the beam. In the present embodiment, the optical switch is provided wherein a photodiode N and photo sensor M are mounted on a frame holding the X motor onto the carriage assembly 30. An opaque extension V which is located on the member 34 is designed to break the light beam from the photodiode N when the moveable support member 34 is in the fully retracted position. Similarly, a photodiode K and a photosensor L are located on the support plate 12, an opaque extension J is located on the carriage 30 so that when the Y motor is fully retracted, the light emanating from the photodiode K will be broken. Accordingly, the intersection obtained when the X, Y motors are in their fully retracted positions in the origin for an X, Y reference system. This position is also known as the "Home" position. The X, Y base distances are measured from the X, Y reference system and the X base distance is measured from the Y axis to the diameter of the largest diameter disk (i.e., disk 0) of sub-stack 26, whereas the Y base distance is the distance from the X axis to the largest diameter disk. All sub-stacks (which are numbered from 0 to n) of disk pack (FIG. 1) will be measured from the "Home" position and a sub-stack's location is determined by multiplying the width of the sub-stack by the number of sub-stacks and adding the Y base distance (e.g., 160n + Y base).

Returning now to FIG. 16, it will be recalled that when the "New Stack Number (#) Does Not Equal the Old Stack Number (#)", the picker arm returns to "Home X" position (i.e., the position determined by the full retraction of the X motor), wherein the picker arms P, Q are removed from old stack and is prepared to be moved to a new stack as shown in FIG. 2. When the picker is in the "Home X" position as shown in FIG. 2, the arm P is at the position where X=0, and the center line of the old disk is between arms P, Q. The "Home X" position of the picker arms P, Q is shown in FIG. 2 with respect to a disk of an adjacent sub-stack (not shown). This step is identified in the P, Q program listing attached herewith as statement 58 and 311 to 328 on the extreme left hand side. The second leftmost column of the program listing is the memory address in the microprocessor 50 where the program instruction resides and juxtaposed to the memory address is the machine code for the program instruction. The third column of the program is the instruction in assembly language.

After the picker arms P, Q are in the "Home X" position, the microprocessor calculates the Yo entry point (i.e., the position of the picker arms P, Q for selecting the largest disk) to the newly selected stack which is determined by the input disk number. The distance along the Y axis to the Yo entry point for sub-stack 26 is the Y base distance, which is 100 mils in the present embodiment, plus 60 mils (i.e., 3 units along the Y axis) making a total of 160 mils from the X axis. The co-ordinates of the Yo entry point are Y=160, X=0 (i.e., the arm P is at these co-ordinates) and is shown in FIG. 3. It should be recalled that sub-stack 26 is the first sub-stack of n sub-stacks forming the disk pack 24 (FIG. 1). In order to calculate the Yo entry point co-ordinate for any other sub-stack a multiple of 160 mils (the width of a sub-stack) is added to the original Yo. (Program listing 60–63) Accordingly, in our example wherein the eleventh sub-stack is selected, the Yo value would be calculated by the microprocessor 50 to be 1.76 inches (160 + 10 × 160).

After the microprocessor moves the picker arm P to the Yo entry point (Program listing 64), the algorithm indicates an additional radial move of the picker arm P to the $\phi$ co-ordinate (Program listing 66). This sequence of the operation is shown in FIG. 4 wherein the picker arm is prepared to select the zero or largest diameter disk of the sub-stack. Returning again to FIG. 17, at the Yo position, the larger arm P will be 60 mils from the zero disk and the shorter arm Q will be 40 mils therefrom. The X base distance in the present embodiment is 105 mils. Therefore, the new co-ordinates for this Yo entry point position (i.e., for arm P) are Yo=160 mils (100+60), Xo=105 mils.

The algorithm shown in FIG. 16 indicates that the Y1 pick point co-ordinate is next calculated (Program listing 67, 68). Let us assume that in FIG. 17 the number 1 (second largest disk) is to be selected. Since the Y1 pick point is always 60 mils from a disk to be selected, the microprocessor 50 will calculate that the picker arm will be moved 20 mils leftward of the Yo co-ordinate. Hence the co-ordinates to select the number 1 disk are Y1=180 mils, Xo=105 mils.

After the movement of the picker arms P, Q to the Y1 pick point co-ordinate (Program listing 69), the X1 pick point for the number 1 disk is calculated (Program listing 70 to 72) by the microprocessor 50 which will be located on the pick line. The X, Y pick point co-ordinates for the number 1 disk will be Y1=180 mils, X1=147 mils. As can be readily appreciated by again referring to FIG. 6, which depicts the movement of the picker arms P, Q to the Y1, X1 co-ordinates (Program listing ]3), the calculation of the microprocessor does not alter the Y1 co-ordinate and merely adds 42 mils to the previous Xo co-ordinate. Hence, at this point in time, the picker arm P is located on the pick line after the microprocessor moves the member 34 to the Y1, X1 co-ordinates.

In accordance with the next step in the flow chart, the Y2 acquisition point co-ordinate is calculated (Program listing 74, 75) for disk number 1. It will be recalled that the acquisition line is an imaginary line 40 mils from the disk edge line on the Y axis and Y2 is a co-ordinate on the acquisition line. The Y2 co-ordinate for the number 1 disk is the value of the Y1 co-ordinate (180 mils) minus 5Y units (5 × 20 mils) or 80 mils. Therefore, the co-ordinates of the picker arm P calculated by the microprocessor are Y2=80 mils, X2=147 mils. As was discussed previously, the picker arm P is moved to the co-ordinates just calculated in the same manner as shown in FIG. 7 (Program listing 76).

The next movement by the microprocessor (Program listing 78) is to move the picker arms P, Q two co-ordinates from the X1 point (i.e., move X1+2 co-ordinates). Since the X1 co-ordinate in our example is 147 mils and each co-ordinate in the X direction is approximately 21 mils (in the present embodiment, each co-ordinate is actually 20.8 mils), the new co-ordinates after this movement are new co-ordinates Y2=80 mils, X2=189 mils. This is the capture step similar to that shown in FIG. 8.

The microprocessor 50 next calculates (Program listing 79, 80) the Y3 co-ordinate centerline of the new disk to be selected. The centerline of the number 1 disk from the captured acquisition position will be obtained by moving (Program listing 81) the picker arms P, Q 60 mils (3Y units) from the Y2 position so that the new co-ordinates are Y3=120 mils, X2=189 mils.

When the largest disk has not been selected, the microprocessor will move (Program listing 92, 93) the picker arms P, Q directly to the #$\phi$ track or a track desired. The proper distance to be moved is calculated by the microprocessor since the #$\phi$ track or any of the other 76 recording tracks are a fixed and known distance from the X Home sensor.

In the case where the largest disk is selected an axial movement (Program listing 85, 86) to clear the smallest disk is needed as shown in FIG. 14. Following this step the microprocessor moves arms P, Q to X co-ordinate 16, which is inside the edge of the smallest disk (Program Listing 87, 88). Since a radial movement of 16X co-ordinates represents 336 mils (16 × 21 units), the new co-ordinates are Y=160 mils, X=441 (336+105) mils. This operational step is shown in FIG. 14.

After the above operational calculation and step is completed, the largest (i.e., disk number 0) is returned to its center line (Program Listing 89–91) or normal plane of rotation as shown in FIG. 15 in accordance with the flow chart. Hence, after having been axially moved Y-3 co-ordinates or 60 mils the microprocessor moves the disk Y-3 co-ordinates (i.e., 60 mils in the opposite direction). At this point, the Y, X co-ordinates would be Y=100 mils, X=147 mils.

The final step of the algorithm was previously described and shown (FIG. 10) with respect to the selection of the fourth largest disk. The calculation and the operation of this step (Program Listing 92, 93) are identical to that previously described.

If the new stack is equal to the old stack, steps 58–66 of the program listing is omitted, and steps 96–106 are executed in their place.

The microprocessor discussed herein and the Program Listing appended hereto is based on an Intel 8080A 8-bit N-channel chip.

```
OMEGA 6030 ASSEMBLY                              FLOPPY PACK HEAD MOTION CONTROL          FJA-011378
************************************************************************************************

*** I/O DEVICE EQUATES
MOTSTAT  EQU   080H       MOTOR STATUS REGISTER
MOT1DIR  EQU   0E2H       Y MOTOR DIRECTION COMMAND
MOT1STP  EQU   080H       Y MOTOR STEP COMMAND
MOT2DIR  EQU   083H       X MOTOR DIRECTION COMMAND
MOT2STP  EQU   081H       X MOTOR STEP COMMAND

************************************************************************************************
* NOTE -
*   THE DISK PICKING SUBROUTINE ("PICKDISK") IS BASED ON AN X,Y
*   COORDINATE SYSTEM WHOSE CHARACTERISTICS ARE AS FOLLOWS:
*     1) THE Y AXIS IS DEFINED AS RUNNING PARALLEL TO THE AXIS
*        OF THE DISK PACK.
*     2) THE ORIGIN OF THE Y AXIS IS ON THE PLANE DESCRIBED
*        BY DISK #00H.
*     3) THE POSITIVE Y DIRECTION IS TOWARD THE HIGHER NUMBERED
*        DISKS.
*     4) 1 Y UNIT IS EQUIVALENT TO THE DISK-TO-DISK DISTANCE.
*     5) THE X AXIS IS DEFINED AS RUNNING PERPENDICULAR TO THE
*        AXIS OF THE DISK PACK.
*     6) THE ORIGIN OF THE X AXIS IS ON THE ACQUISITION LINE FOR
*        THE SET OF LARGEST DISKS.
*     7) THE POSITIVE X DIRECTION IS TOWARD THE AXIS OF THE
*        DISK PACK.
*     8) 1 X UNIT IS EQUIVALENT TO THE TRACK-TO-TRACK
*        DISTANCE.
************************************************************************************************
```

```
                            PAGE

*
       *'PICKDISK' MOVES THE HEAD FROM ITS CURRENT LOCATION TO TRACK
       *       # 0 OF THE SPECIFIED DISK.
       *       PREREQUISITES:  RA = # OF DISK TO BE PICKED
       *
0000 47        PICKDISK  MOV   B,A             ;SAVE DISK #
0001 5F                  MOV   E,A             ;PUT Y COORD OF DESIRED DISK IN D&E
0002 1600                 MVI   D,0
0004 E678                 ANI   78H
0006 4F                   MOV   C,A             ;EXTRACT STACK # BITS
0007 3AFC31                LDA   ERRFLG
000A B7                    ORA   A               ;CHECK IF ANY ERRORS FROM PREVIOUS PICK
000B FA1900                JM    PCKDSK0         ;J IF SO (CAN'T ASSUME CURRENT POS IS CORRECT)
000E 3AFD01                LDA   DSK#3           ;GET LAST ACCESSED DISK #
0011 B3                    CMP   B               ;CHECK IT VS DESIRED DISK #
0012 C3                    RE                    ;DONE IF THE SAME
0013 E678                 ANI   78H             ;EXTRACT STACK # BITS
0015 B3                    CMP   C
0016 CA6300               JE    SAMESTAK        ;J IF ALREADY IN CORRECT STACK
0019 CDA301               CALL  HOMX            ;WITHDRAW FROM CURRENT STACK
001C D5         PCKDSK0   PUSH  D               ;SAVE Y COORD OF DISK
001D 59                    MOV   E,C             ;MAKE Y COORD OF 1ST DISK IN DESIRED STACK
001E 2AEE01                LHLD  EP              ;GET ENTRY POINT COORDINATE
0021 19                    DAD   D
0022 C1                    POP   B
0023 CDFF00                CALL  POSY            ;CALC ENTRY POINT TO STACK
0026 3E00                 MVI   A,0             ;POSITION Y TO ENTRY POINT
0028 CD3031               CALL  POSX            ;POSITION X TO ENTRY POINT
002B 2AFG01                LHLD  FLOPL           ;GET FLOP LEFT DISPLACEMENT
002E 19                    DAD   D               ;CALC PICK POINT Y COORDINATE
002F CD7F00               CALL  POSY            ;POSITION Y TO PICK POINT COORD
0032 78                    MOV   A,B             ;EXTRACT DISK # WITHIN STACK
0033 E607                 ANI   7
0035 07                    RLC                   ;MULT BY 2 COORD UNITS PER RADIUS DELTA
0036 CD3031     PCKDSK1   CALL  POSX            ;POSITION X TO PICK POINT COORD
0039 2AF201                LHLD  FLOPR           ;GET FLOP RIGHT DISPLACEMENT
003C 19                    DAD   D               ;CALC ACQUISITION POINT Y COORD
003D CD7F00               CALL  POSY            ;POSITION Y TO ACQUISITION POINT
0040 210200               LXI   H,2
0043 CD7E01               CALL  MOVX            ;MOVE X IN TO CAPTURE DISK
0046 68                    MOV   L,B             ;DESIRED POS TO H&L
0047 62                    MOV   H,D
0048 CD7F00               CALL  POSY            ;POSITION Y TO CENTER LINE OF DISK
004B 78                    MOV   A,B
004C E607                 ANI   7
004E C25700    PCKDSK2    JNZ   NOTDSK0         ;J IF DESIRED DISK NOT = 0
0051 210300                LXI   H,3
0054 CD0000                CALL  MOVY            ;MOVE Y TO AVOID DISK # 7 OF ADJACENT STACK
0057 3E10                  MVI   A,16
0059 CD3031               CALL  POSX            ;POSITION X INSIDE RADIUS OF DISK # 7
005C 6B                    MOV   L,E             ;DESIRED POS TO H&L
005D 62                    MOV   H,D
005E CD7F00               CALL  POSY            ;<POS Y BACK TO CENTER LINE IN DSK #0 CASE.>
0061 3AF401    NOTDSK0    LDA   TRK0POS
0064 CD3001               CALL  POSX            ;POSITION X TO TRACK #0
0067 C9                    RET                   ;END OF 'PICKDISK'
```

```
0095  0069  3AF901          SAMESTAK  LDA   YCOORD           GET LOW BYTE OF CURRENT Y COORD
0096  006B  E607                      ANI   7                EXTRACT DISK #
0097  006D  07                        RLC
0098  006E  CD3001                    CALL  POSX             WITHDRAW TO EDGE OF CURRENT DISK
0099  0071  78                        MOV   A,B
0100  0072  E607                      ANI   7
0101  0074  07                        RLC
0102  0075  21FB01                    LXI   H,XCOORD         MAKE X COORD OF DESIRED DISK
0103  0078  BE                        CMP   M                CHECK IT VS CURRENT X COORD
0104  0079  D22B00                    JNC   PCKDSK1          J IF DESIRED >= CURRENT
0105  007C  C33600                    JMP   PCKDSK2          J WHEN DESIRED < CURRENT
0106                                  PAGE
0107
0108  *
0109  *  'POSY' MOVES THE HEAD TO THE SPECIFIED Y COORDINATE.
0110  *     PREREQISITE:  HL = DESIRED Y COORDINATE
0111  *
0112  007F  C5              POSY      PUSH  B                SAVE B&C (B=DESIRED DISK)
0113  0080  D5                        PUSH  D                SAVE D&E (Y COORD OF DESIRED DISK)
0114  0081  E5                        PUSH  H                SAVE DESIRED Y COORD
0115  0082  EB                        XCHG                   DESIRED Y COORD TO D&E
0116  0083  3ACC01                    LDA   YSCALE           GET # OF MOTOR STEPS PER COORDINATE UNIT
0117  0086  CD0631                    CALL  MULT             SCALE DESIRED POSITION
0118  0089  EB                        XCHG                   RESULT TO D&E
0119  008A  2AE801                    LHLD  YBASE
0120  008D  19                        DAD   D                ADD Y HOME SENSOR OFFSET
0121  008E  EB                        XCHG
0122  008F  2AF501                    LHLD  YLOC             GET CURRENT Y MOTOR LOCATION
0123  0092  7B                        MOV   A,E
0124  0093  95                        SUB   L                DESIRED LOCATION - CURRENT LOCATION
0125  0094  4F                        MOV   C,A
0126  0095  7A                        MOV   A,D
0127  0096  9C                        SBB   H
0128  0097  F5                        PUSH  PSW              SAVE MSB OF DIFF & CARRY FLAG
0129  0098  B1                        ORA   C
0130  0099  CAC800                    JZ    NOPOS            J IF DESIRED = CURRENT
0131  009C  F1                        POP   PSW
0132  009D  D3B2            POSY1     OUT   MOT1DIR          SET MOTOR DIRECTION WITH MSB OF RA
0133  009F  012100                    LXI   B,1              ASSUME DIRECTION IS LEFT
0134  00A2  D2A600                    JNC   POSYLOP          J IF SO
0135  00A5  01FFFF                    LXI   B,-1             SET YLOC DELTA FOR RIGHT
0136  00A8  CD1A01          POSYLOP   CALL  YBUSY
0137  00AB  C22C00                    JNZ   NOPOS+1          ABORT IF LOCKOUT
0138  00AE  D3B0                      OUT   MOT1STP          STEP Y MOTOR
0139  00B0  09                        DAD   B                CHANGE CURRENT LOCATION (H&L)
0140  00B1  7D                        MOV   A,L
0141  00B2  5B                        MOV   E                COMPARE CURRENT VS. DESIRED
0142  00B3  CAA800                    JRE   POSYLOP          J IF NOT THERE YET
0143  00B6  7C                        MOV   A,H
0144  00B7  BA                        CMP   D
0145  00B8  C2A800                    JNE   POSYLOP
0146  00BB  22F501                    SHLD  YLOC             UPDATE CURRENT LOCATION WHEN DONE
0147  00BE  CD1A01                    CALL  YBUSY            WAIT FOR MOTOR TO FINISH
0148  00C1  C2CC00                    JNZ   NOPOS+1          ABORT IF LOCKOUT
0149  00C4  E1                        POP   H
0150  00C5  22F901                    SHLD  YCOORD           SET CURRENT Y COORD
0151  00C8  D1                        POP   D
```

```
                    POP     B
                    RET
NOPOS               POP     A
                    POP     H
                    POP     D
                    POP     B
                    RET

***
*** 'MOVY' MOVES THE HEAD THE SPECIFIED NUMBER OF COORDINATE
*** UNITS (POSITIVE OR NEGATIVE) IN THE Y DIRECTION.
*** PREREQUISITE: HL = DESIRED DISTANCE (SIGNED 2'S COMPLEMENT)
***
0166  3E03      7C           MOVY    MOV     A,H
0167  0201      B5                   ORA     L
0168  0202      C8                   RZ                              DONE IF DISTANCE TO MOVE = 0
0169  0203      E5                   PUSH    H                       SAVE D&E
0170  0204      D5                   PUSH    D                       SAVE D&E (Y COORD OF DESIRED DISK)
0171  0205      EB                   XCHG                            DESIRED Y COORD TO D&E
0172  0206  2AF901                   LHLD    YCOORD                  GET CURRENT Y COORD
0173  0209      19                   DAD     D                       CALC DESIRED Y COORD
0174  020A      E5                   PUSH    H                       AND SAVE IT
0175  020B  3AEC01                   LDA     YSCALE                  SCALE DESIRED COORDINATE
0176  020E  CDD601                   CALL    MULT                    RESULT TO D&E
0177  0211      EB                   XCHG                            GET CURRENT LOCATION
0178  0212  2AF501                   LHLD    YLOC                    CALC DESIRED LOCATION
0179  0215      19                   DAD     D
0180  0216      7C                   MOV     A,H
0181  0217      B7                   ORA     A
0182  0218      FAE800               JM      $
0183  021B      EB                   XCHG                            DESIRED LOC TO D&E
0184  021C      7C                   MOV     A,H                     SIGN OF DISTANCE TO RA
0185  021D      0F                   RLC
0186  021E      0F                   RRC                             & TO CARRY FLAG
0187  021F  2AF501                   LHLD    YLOC                    GET CURRENT LOCATION
0188  0222  C33D00                   JMP     POSY1                   MERGE WITH 'Y POSITION' ROUTINE

***
*** 'HOMY' MOVES THE HEAD TO THE Y HOME SENSOR.
*** TRAPS IF SENSOR FOUND WHEN NOT EXPECTED.
*** PREREQUISITE: NONE
***
0195  0225  3EFF         HOMY        MVI     A,-1
0196  0227  D3B2                     OUT     MOTIDIR                 SET Y MOTOR DIRECTION
0197  0228  2AF501                   LHLD    YLOC                    GET CURRENT LOCATION
0198  022B  CD1A01      HOMYLOP      CALL    YBUSY
0199  022E  C21601                   JNZ     HOMYABT                 ABORT HOME IF LOCKOUT
0200  0231      07                   RLC                             (LEFT SHIFTED STATUS IN RA FROM 'YBUSY')
0201  0232  DA0C01                   JC      HOMYDON                 J IF AT HOME
0202  0235      D3B0                 OUT     MOT1STP                 STEP Y MOTOR
0203  0237      2B                   DCX     H                       CHANGE CURRENT LOCATION
0204  0238  C3FC00                   JMP     HOMYLOP
0205  023B      7C       HOMYDON     MOV     A,H
0206  023C      B5                   ORA     L
0207  023D  CA1601                   JZ      HOMYABT                 J IF NO MOTOR STEPS MISSED
0208  0241      FF                   RST     7
```

```
0209
0210
0211  0112 210000      LXI   H,0              FORCE Y LOC = 0
0212  0115 AF          XRA   A                SET Z FLAG
0213  0116 22F501      SHLD  YLOC
0214  0119 C9          RET
0215
0216
0217  ;*
0218  ;* 'YBUSY' SAMPLES STATUS OF THE Y MOTOR UNTIL EITHER 'LOCKOUT'
0219  ;* OR 'NOT BUSY' IS DETECTED. SETS THE ERROR FLAG IF
0220  ;* 'LOCKOUT'.
0221  ;* PREREQUISITE: NONE
0222  011A D680        YBUSY IN    MOTSTAT          READ MOTOR STATUS
0223  011C E620              ANI   20H              CHECK LOCKOUT BIT OF STATUS
0224  011E D680              IN    MOTSTAT
0225  0120 07                RLC
0226  0121 C22801            JNZ   LOSTAT           J IF LOCKOUT BIT SET
0227  0124 DA1A01            JC    YBUSY            J IF Y MOTOR BUSY
0228  0127 C9                RET
0229  0128 F5          LOSTAT PUSH  A               SAVE ROTATED STATUS & ZERO FLAG
0230  0129 3E84              MVI   A,84H
0231  012B 32FC01            STA   ERRFLG           SET LOCKOUT BIT IN ERROR FLAG
0232  012E F1                POP   A
0233  012F C9                RET
0234                         PAGE
0235
0236  ;*
0237  ;* 'POSX', 'MOVX', 'HOMX' AND 'XBUSY' ARE THE X MOTOR CONTROL
0238  ;* ROUTINES CORRESPONDING TO THE SIMILARLY NAMED ROUTINES
0239  ;* FOR THE Y MOTOR.
0240  ;* PREREQUISITES ARE THE SAME AS THOSE IN THE Y ROUTINES
0241  ;* EXCEPT:
0242  ;*   'POSX': A = DESIRED X COORDINATE
0243  ;*
0244  0130 C5          POSX  PUSH  B
0245  0131 D5                PUSH  D
0246  0132 5F                MOV   E,A
0247  0133 1600              MVI   D,0
0248  0135 F5                PUSH  A                SAVE DESIRED X COORD
0249  0136 3AED01            LDA   XSCALE
0250  0139 CD0601            CALL  MULT
0251  013C EB                XCHG
0252  013D 2AEA01            LHLD  XBASE
0253  0140 19                DAD   D
0254  0141 EB                XCHG
0255  0142 2AF701            LHLD  XLOC
0256  0145 7B                MOV   A,E
0257  0146 95                SUB   L
0258  0147 4F                MOV   C,A
0259  0148 7A                MOV   A,D
0260  0149 9C                SBB   H
0261  014A F5                PUSH  A
0262  014B E1                POP   A
0263  014C CAC833            JZ    NOPOS
0264  014F F1                POP   A
0265  0150 D3E3              OUT   MOT2DIR
      0152 010100            LXI   B,1
      0155 D25601            JNC   POSXLOP
      0158 01FFFF            LXI   B,-1      POSX1
```

| | | | | |
|---|---|---|---|---|
| 0266 | 015B CDC301 | POSXLOP | CALL | XBUSY | 0532 |
| 0267 | 015E C2CC00 | | JNZ | NOPOS+1 | 0534 |
| 0268 | 0161 D3B1 | | OUT | MOT2STP | 0536 |
| 0269 | 0163 09 | | DAD | B | 0538 |
| 0270 | 0164 7D | | MOV | A,L | 0540 |
| 0271 | 0165 BB | | CMP | E | 0542 |
| 0272 | 0166 C25B01 | | JNE | POSXLOP | 0544 |
| 0273 | 0169 7C | | MOV | A,H | 0546 |
| 0274 | 016A 8A | | CMP | D | 0548 |
| 0275 | 016B C25B01 | | JNE | POSXLOP | 0550 |
| 0276 | 016E 22F701 | | SHLD | XLOC | 0552 |
| 0277 | 0171 CDC801 | | CALL | XBUSY | 0554 |
| 0278 | 0174 C2CC00 | | JNZ | NOPOS+1 | 0556 |
| 0279 | 0177 F1 | | POP | A | 0558 |
| 0280 | 0178 32FB01 | | STA | XCOORD | 0560 |
| 0281 | 017B D1 | | POP | D | 0562 |
| 0282 | 017C C1 | | POP | B | 0564 |
| 0283 | 017D C9 | | RET | | 0566 |
| 0284 | | | | | 0568 |
| 0285 | | ** MOVX | | | 0570 |
| 0286 | 017E 7C | | MOV | A,H | 0572 |
| 0287 | 017F B5 | | ORA | L | 0574 |
| 0288 | 0180 C8 | | RZ | | 0576 |
| 0289 | 0181 C5 | | PUSH | B | 0578 |
| 0290 | 0182 D5 | | PUSH | D | 0580 |
| 0291 | 0183 EB | | XCHG | | 0582 |
| 0292 | 0184 3AFB01 | | LDA | XCOORD | 0584 |
| 0293 | 0187 83 | | ADD | E | 0586 |
| 0294 | 0188 F5 | | PUSH | A | 0588 |
| 0295 | 0189 3AED01 | | LDA | XSCALE | 0590 |
| 0296 | 018C CDD601 | | CALL | MULT | 0592 |
| 0297 | 018F EB | | XCHG | | 0594 |
| 0298 | 0190 2AF701 | | LHLD | XLOC | 0596 |
| 0299 | 0193 19 | | DAD | D | 0598 |
| 0300 | 0194 7C | | MOV | A,H | 0600 |
| 0301 | 0195 B7 | | ORA | A | 0602 |
| 0302 | 0196 FA9601 | | JM | $ | 0604 |
| 0303 | 0199 EB | | XCHG | | 0606 |
| 0304 | 019A 7C | | MOV | A,H | 0608 |
| 0305 | 019B 07 | | RLC | | 0610 |
| 0306 | 019C 0F | | RRC | | 0612 |
| 0307 | 019D 2AF701 | | LHLD | XLOC | 0614 |
| 0308 | 01A0 C35001 | | JMP | POSX1 | 0616 |
| 0309 | | | | | 0618 |
| 0310 | | ** HOMX | | | 0620 |
| 0311 | 01A3 3EFF | HOMX | MVI | A,-1 | 0622 |
| 0312 | 01A5 D3B3 | | OUT | MOT2DIR | 0624 |
| 0313 | 01A7 2AF701 | | LHLD | XLOC | 0626 | GET CURRENT X COORD
| 0314 | 01AA CDC801 | HOMXLOP | CALL | XBUSY | 0628 | CALC DESIRED X COORD
| 0315 | 01AD C2C401 | | JNZ | HOMXABT | 0630 | AND SAVE IT
| 0316 | 01B0 0F | | RRC | | 0632 |
| 0317 | 01B1 DAB401 | | JC | HOMXDON | 0634 |
| 0318 | 01B4 D3B1 | | OUT | MOT2STP | 0636 |
| 0319 | 01B6 2B | | DCX | H | 0638 |
| 0320 | 01B7 C3AA01 | | JMP | HOMXLOP | 0640 |
| 0321 | 01BA 7C | HOMXDON | MOV | A,H | 0642 |
| 0322 | 01BB B5 | | ORA | L | 0644 |

```
0323  018C CAC401              JZ    HOMXABT
0324  018F FF                  RST   7
0325  01C0 210000              LXI   H,0
0326  01C3 AF                  XRA   A
0327  01C4 22F701       HOMXABT SHLD  XLOC
0328  01C7 C9                  RET
0329
0330  *
0331  01C8 DB80        XBUSY   IN    MOTSTAT         READ MOTOR STATUS
0332  01CA E620               ANI   20H             CHECK LOCKOUT BIT
0333  01CC DB80               IN    MOTSTAT
0334  01CE 0F                 RRC
0335  01CF C22801             JNZ   LOSTAT
0336  01D2 DAC801             JC    XBUSY
0337  01D5 C9                 RET
0338
0339  *
0340  01D6 C5         MULT    PUSH  B               SAVE B&C
0341  01D7 210000             LXI   H,0
0342  01DA 0E08              MVI   C,8
0343  01DC 29         MULTLOP DAD   H               LEFT SHIFT PARTIAL PRODUCT
0344  01DD 07                 RLC
0345  01DE D2E201             JNC   $+4
0346  01E1 19                 DAD   D
0347  01E2 0D                 DCR   C
0348  01E3 C20C01             JNZ   MULTLOP
0349  01E6 C1                 POP   B
0350  01E7 C9                 RET                   RESULT IN H&L
0351
0352  *
0353  *** PHYSICAL PARAMETERS
0354  01E8 1D00       YBASE   DW    29              # OF Y MOTOR STEPS FROM THE Y SENSOR TO Y COORDINATE 0
0355  01EA 0400       XBASE   DW    4               DITTO FOR X
0356  01EC 08         YSCALE  DB    8               # OF Y MOTOR STEPS NEEDED TO MOVE 1 Y COORDINATE UNIT
0357  01ED 01         XSCALE  DB    1               DITTO FOR X
0358  01EE 0400       EP      DW    4               DISTANCE FROM DISK # 0 OF A STACK TO THE STACK ENTRY POINT
0359  01F0 0200       FLOPL   DW    2               MAXIMUM AMOUNT OF DISK FLOP TO THE LEFT (POSITIVE Y DIRECTION)
0360  01F2 FEFF       FLOPR   DW    -2              MAXIMUM AMOUNT OF DISK FLOP TO THE RIGHT (NEGATIVE Y DIRECTION)
0361  01F4 45         TRKGPOS DB    69              X COORDINATE OF TRACK # 0 ON ALL DISKS
0362
0363  *
0364  *** WORKING STORAGE
0365  01F5            YLOC    DS    2               CURRENT Y LOCATION OF THE HEAD (# OF MOTOR STEPS FROM Y SENSOR)
0366  01F7            XLOC    DS    2               DITTO FOR X
0367  01F9            YCOORD  DS    2               CURRENT Y COORDINATE OF THE HEAD
0368  01FB            XCOORD  DS    1               DITTO FOR X
0369  01FC            ERRFLG  DS    1               ERROR FLAG TO DENOTE ABORTED OR ERRONEOUS PICKS
0370  01FD            DSK#B   DS    1               THE LAST PICKED DISK #
0371                          END
```

THE NEXT AVAILABLE LOCATION IS 01FEH.

NO ERRORS

What is claimed is:

1. A method for randomly accessing by means of a pair of parallel and unequal length picker arms, which carry a read/write means thereon, a thin, flexible, magnetic multi-track disk from a plurality of closely-spaced, rotating, flexible and axially arranged magnetic disks in a stack having different outside diameters which are arranged in a uniformly ascending order comprising steps of:
   (a) rotating said disks in their respective planes of rotation, each said disk being characterized by a natural tendency to flutter while rotating in its dynamic state;
   (b) moving the larger of said picker arms by contacting a disk to be accessed while in its dynamic state such that said disk is moved in a direction beyond the range wherein it has a natural tendency to flutter, to a position where said disk becomes relatively stable while rotating;
   (c) moving said picker arms radially inward a distance while the accessed disk has become relatively stable, such that free ends of said longer and shorter arms are within diameter dimensions of adjacent disks, to locate said to be accessed disk between said picker arms wherein the disk is positively captured therebetween;
   (d) moving said picker arms so as to return said positively captured disk to its normal plane of rotation where said disk may freely rotate between said picker arms for reading or writing information on said disk,
   (e) whereby said random accessing is performed with minimum error and relatively rapid access time.

2. The method in accordance with claim 1, including the step of:
   (a) rotating said thin flexible disks on an order of 250–720 RPM.

3. The method in accordance with claim 1 wherein the step of moving the largest of said picker arms by contacting a disk to be accessed is such that said disk is moved in a direction beyond its natural tendency to flutter and assembly tolerance build-up.

4. The method for randomly accessing, by means of a pair of parallel and unequal length picker arms which carry a read/write means thereon, a flexible, magnetic, multi-track largest diameter disk from a stack of closely spaced rotating, flexible and axially arranged magnetic disks having different diameters which are arranged in a uniformly ascending order, the improvement comprising the steps of:
   (a) deflecting through positive engagement said largest diameter disk to be accessed out of its normal plane of rotation by an axial movement of said larger picker arm beyond the plane of rotation of said disk in a direction away from other disks in said stack, each said disk being characterized by a natural tendency to flutter while rotating in its dynamic state prior to said deflection step and, each said disk being relatively stable while rotating after said deflection step;
   (b) moving said picker arms radially inward while said disk is relatively stable to locate said largest disk between said arms so that the disk is positively captured;
   (c) deflecting said largest diameter disk in a direction opposite to said first-mentioned deflection and past a natural amplitude of flutter of a smallest disk of an adjacent stack by an axial movement of the picker arms;
   (d) positioning said picker arms radially inward to clear the adjacent smallest diameter disk;
   (e) positioning said arms to return the largest diameter disk to its normal plane of rotation where said disk may freely rotate between said picker arms;
   (f) positioning said arms radially inward so that the read/write head is adjacent a desired disk track of the largest disk for reading or writing information thereon.

5. The method in accordance with claim 4, including the step of:
   (a) rotating said disks on the order of 250–720 RPM.

6. The method of randomly accessing by means of a pair of parallel and unequal length picker arms which respectively carry a read/write means thereon, a flexible, magnetic multi-track disk from a stack of closely spaced, rotating, flexible and axially arranged magnetic disks having different diameters which are arranged in a uniformly ascending order, the improvement comprising the steps of:
   (a) moving said picker arms to a home position, said arms being fully retracted at the home position in an axial and radial direction;
   (b) moving said arms along said axial home position to a position opposite the stack from which a disk is to be accessed;
   (c) moving said arms radially inward toward said stack whereby the picker is positioned to access a largest disk of the stack; said largest disk being characterized by a natural tendency to flutter while rotating in its dynamic state
   (d) moving said arms axially in a direction away from the smaller disks of the stack to move said largest disk out of its normal plane of rotation and beyond its natural tendency to flutter to a position where the disk becomes stable by a positive engagement of the largest picker arm with said largest disk;
   (e) moving said arms radially inward to capture the largest disk between the tips of said arms while said disk has become stable;
   (f) moving said arms axially in a direction past a normal amplitude of flutter of a smallest disk of an adjacent stack;
   (g) moving said arms radially until the end of said shorter arm is further inward than said smallest diameter disk;
   (h) moving said arms to align said largest disk into its normal plane of rotation so that said disk can freely rotate;
   (i) moving said arms radially inward so that the read/write means are opposite a desired track on said captured disk.

7. A method of randomly accessing by means of a pair of parallel and unequal length picker arms which respectively carry a read/write means thereon, a flexible, magnetic, multitrack disk from a stack of closely spaced, rotating, flexible and axially arranged magnetic disks having different diameters which are arranged in a uniformly ascending order, the improvement comprising the steps of:
   (a) retracting said picker arms to a radial and axial home position, said home positions providing a reference location for accessing various disks of the stack;
   (b) moving said arms along a reference line corresponding to said axial home position and opposite the stack from which a disk is to be accessed;

(c) moving said arms radially inward from said radial home position reference toward said stack whereby the picker is positioned to access a largest disk of the stack;

(d) moving said arms axially in order to position said arms in order to access a disk smaller than said largest disk;

(e) moving said arms radially inward in order to juxtapose the latter with respect to the disk to be selected;

(f) moving said disk to be accessed in a direction beyond the range wherein it has a natural tendency to flutter by an axial movement and positive engagement of said picker arms in a direction away from disks that have smaller diameters such that the disk becomes relatively stable while rotating;

(g) moving said arms radially inward a distance while said disk is relatively stable such that free ends of the longer and shorter picker arms are substantially inside the diameter dimensions of adjacent smaller and larger disks, respectively, whereby said disk to be accessed is positively captured;

(h) moving said arms to align said disk to be accessed into its normal plane of rotation where said positively captured disk may freely rotate;

(i) moving said arm radially inward an additional distance so that the read/write means are opposite a desired track on said captured disk for reading or recording information thereon.

8. The method of randomly accessing in accordance with claim 7, including additional steps of:

(a) selecting a new disk to be accessed which is located in the same stack, said new disk being smaller in diameter than the disk previously accessed;

(b) moving tips of said arms to an edge line of the disk just accessed, said edge line comprising an imaginary line through the edges of the stacked disks;

(c) moving said arms axially in order to relocate the picker for selecting the smaller disk;

(d) moving said arms radially inward whereby the larger picker arm is positioned laterally opposite said new disk to be accessed;

(e) moving said new smaller disk to be accessed out of its plane of rotation by an axial movement of said picker arms beyond a natural amplitude of vibration of the new disk to be accessed in a direction away from disks that have smaller diameters;

(f) moving said arms radially inward a distance such that free ends of the larger and shorter picker arms are substantially inside the diameter dimensions of adjacent smaller and larger disks, respectively, whereby said disk to be accessed is positively captured;

(g) moving said arms to align said smaller disk into its normal plane of rotation;

(h) moving said arms radially inward an additional distance so that the read/write means are opposite a desired track on said captured disk.

9. The method of randomly accessing in accordance with claim 7, including additional steps of:

(a) selecting a new disk to be accessed which is located in the same stack, said new disk being larger in diameter than the disk previously accessed;

(b) moving said arms radially outward a distance from the previously accessed disk for accessing the new larger disk;

(c) moving said new larger disk to be accessed out of its normal plane of rotation by an axial movement of said picker arms beyond a natural amplitude of vibration of the larger disk to be accessed in a direction away from disks that have smaller diameters;

(d) moving said arms radially inward a distance such that free ends of the longer and shorter picker arms are within the diameter dimensions of adjacent smaller and larger disks, respectively, whereby said new disk to be accessed is positively captured;

(e) moving said arms to align said new disk into its normal plane of rotation;

(f) moving said arms radially inward a further distance so that the read/write means are opposite a desired track on said captured disk.

10. Apparatus comprising parallel and unequal length picker arms for randomly selecting a flexible data disk from a plurality of closely spaced and rotating flexible data disks in a stack wherein each disk has a different diameter, which are arranged in a uniformly ascending order, the improvement comprising:

(a) means for providing a reference position with respect to said stack for said picker arms in both an axial and radial direction;

(b) means for moving said arms with respect to said radial and axial reference position so as to contact a randomly selected disk by positive engagement and to move said selected disk beyond the range wherein it has a natural amplitude of flutter while rotating in its dynamic state in a direction away from disks that have smaller diameters; said disk thereby becoming relatively stable while rotating (c) means to positively capture said disk to be selected between said arms when said disk is beyond its natural amplitude of flutter and relatively stable so that no other disk may be captured;

(d) said capture means including means to move said picker arms radially inward a distance such that a free end of said longest and shortest picker arms are within the diameter dimensions of the adjacent smaller and larger disks, respectively;

(e) means for returning said positively captured disk to its normal plane of rotation.

(f) means for positioning said picker arms radially inwardly so that said read/write means are located adjacent to a desired track of said accessed disk.

* * * * *